(12) United States Patent
Gaston

(10) Patent No.: US 10,253,202 B2
(45) Date of Patent: *Apr. 9, 2019

(54) PROTECTIVE COATING COMPOSITIONS

(71) Applicant: OMNOVA Solutions Inc., Beachwood, OH (US)

(72) Inventor: James H. Gaston, Chester, SC (US)

(73) Assignee: Omnova Solutions Inc., Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,426

(22) Filed: Dec. 30, 2014

(65) Prior Publication Data

US 2016/0185997 A1    Jun. 30, 2016
US 2017/0226368 A9    Aug. 10, 2017

Related U.S. Application Data

(63) Continuation of application No. 13/384,414, filed as application No. PCT/US2010/041364 on Jul. 8, 2010, now Pat. No. 8,940,826.

(60) Provisional application No. 61/226,114, filed on Jul. 16, 2009.

(51) Int. Cl.

| *C08L 33/02* | (2006.01) |
| *C09D 133/02* | (2006.01) |
| *C08L 91/06* | (2006.01) |
| *C09D 7/42* | (2018.01) |
| *C09D 133/08* | (2006.01) |
| *C09D 135/06* | (2006.01) |
| *C09G 1/04* | (2006.01) |
| *C08L 33/08* | (2006.01) |
| *C08K 5/098* | (2006.01) |

(52) U.S. Cl.
CPC ............ *C09D 133/08* (2013.01); *C08L 33/02* (2013.01); *C09D 7/42* (2018.01); *C09D 133/02* (2013.01); *C09D 135/06* (2013.01); *C09G 1/04* (2013.01); *C08K 5/098* (2013.01); *C08L 33/08* (2013.01); *C08L 91/06* (2013.01)

(58) Field of Classification Search
CPC .......... C08L 91/06; C08L 33/08; C08L 33/02; C09D 133/08; C09D 133/02; C09D 135/06; C09D 7/42; C08K 5/098; C09G 1/04

See application file for complete search history.

(56) References Cited

U.S. PATENT DOCUMENTS

| 3,328,325 A | 6/1967 | Zdanowski |
| 3,467,610 A | 9/1969 | Fiarman |
| 3,554,790 A | 1/1971 | Gehman et al. |
| 3,573,329 A | 3/1971 | Lynn |
| 3,711,436 A | 1/1973 | Oliver et al. |
| 3,808,036 A | 4/1974 | Zdandowski |
| 4,017,662 A * | 4/1977 | Gehman .............. C09D 157/04 427/393 |
| 4,070,510 A * | 1/1978 | Kahn ..................... C09G 1/16 106/10 |
| 4,150,005 A | 4/1979 | Gehman et al. |
| 4,517,330 A | 5/1985 | Zandowski et al. |
| 4,721,752 A | 1/1988 | Schepers et al. |
| 5,149,745 A | 9/1992 | Owens et al. |
| 5,166,259 A | 11/1992 | Schmeing et al. |
| 5,169,884 A | 12/1992 | Lindemann et al. |
| 5,177,128 A | 1/1993 | Lindemann et al. |
| 5,275,846 A * | 1/1994 | Imai ..................... D21H 19/40 427/362 |
| 5,319,018 A | 7/1994 | Owens et al. |
| 5,491,190 A | 2/1996 | Sandvick et al. |
| 5,574,090 A | 11/1996 | Gray et al. |
| 5,574,117 A | 11/1996 | Yoshida et al. |
| 5,587,202 A | 12/1996 | Sandvick et al. |
| 5,599,596 A | 2/1997 | Sandvick et al. |
| 5,676,741 A | 10/1997 | Gray et al. |
| 5,700,516 A | 12/1997 | Sandvick et al. |
| 5,915,436 A | 6/1999 | Johnson et al. |
| 6,228,913 B1 | 5/2001 | Owens et al. |
| 6,410,634 B2 * | 6/2002 | Rufus ........................... 524/430 |
| 6,425,978 B1 | 7/2002 | Diehl et al. |
| 6,660,828 B2 | 12/2003 | Thomas et al. |
| 7,022,801 B2 | 4/2006 | Medsker |
| 7,429,393 B2 | 9/2008 | Wang et al. |
| 8,940,826 B2 * | 1/2015 | Gaston ................... C09D 7/005 524/400 |
| 2004/0094279 A1 * | 5/2004 | Myatt .................... C09K 21/04 162/135 |
| 2004/0138328 A1 * | 7/2004 | Kohr ..................... C08F 285/00 522/149 |
| 2005/0215678 A1 | 9/2005 | Ludtke et al. |
| 2005/0288411 A1 * | 12/2005 | Eichman ................ C09D 5/024 524/376 |
| 2006/0089452 A1 * | 4/2006 | Schneider ............. C09D 7/005 524/589 |
| 2007/0154431 A1 | 7/2007 | Nagai et al. |
| 2008/0096979 A1 | 4/2008 | Pilgaonkar et al. |
| 2009/0042042 A1 | 2/2009 | Yuki et al. |
| 2009/0110946 A1 | 4/2009 | Martin et al. |
| 2012/0157595 A1 * | 6/2012 | Gaston ................... C09D 7/005 524/400 |

FOREIGN PATENT DOCUMENTS

| EP | 0578498 | 1/1994 |
| EP | 0739376 | 10/1996 |

(Continued)

*Primary Examiner* — Satya B Sastri

(74) *Attorney, Agent, or Firm* — Kagan Binder, PLLC

(57) ABSTRACT

Described are polymer compositions that include lattices (e.g., polymer emulsions or suspensions in an aqueous phase) and that contain a gloss reducing agent and that are useful in various finish compositions such as in floor care compositions.

19 Claims, No Drawings

(56) References Cited

FOREIGN PATENT DOCUMENTS

| | | |
|---|---|---|
| EP | 0822768 | 2/1998 |
| EP | 1106102 | 6/2001 |
| EP | 1717281 | 11/2006 |
| EP | 1719794 | 11/2006 |
| WO | WO 95/03135 | 2/1995 |
| WO | WO 95/03360 | 2/1995 |
| WO | WO 96/33638 | 10/1996 |
| WO | WO 2005/026735 | 3/2005 |
| WO | WO 2005/116155 | 12/2005 |
| WO | WO 2007/075209 | 7/2007 |
| WO | WO 2008/011020 | 1/2008 |
| WO | WO 2011008631 A2 * | 1/2011 ............ C09D 7/005 |

* cited by examiner

PROTECTIVE COATING COMPOSITIONS

CROSS-REFERENCE TO RELATED APPLICATION

This application is a continuation of U.S. application Ser. No. 13/384,414, filed Feb. 29, 2012, which claims the benefit from International Application No. PCT/US2010/041364, which was filed on Jul. 8, 2010, which in turn claims priority under 35 U.S.C. § 119(e) to U.S. Provisional Application No. 61/226,114 filed Jul. 16, 2009, each of which is incorporated herein by reference in its entirety.

BACKGROUND INFORMATION

Polymeric coatings are used to coat and protect a variety of surfaces in applications including paints, wood finishing, printing, photography, floor care products, waxes, polishes, etc. A polymer composition can be in the form of one or more solid polymer ingredients dispersed or suspended in a liquid medium, e.g., water, organic solvent, and combinations or blends of organic solvent with water. The polymer composition can be combined with other functional ingredients such as surfactants, catalysts, and gloss control agents to produce useful derivative compositions such as, e.g., a finish composition. A polymer composition or finish composition can be applied to a surface and allowed to dry or cure, to produce a protective coating.

Relative gloss of a dried or cured finish composition can be a very important property of certain compositions, particularly paints, floor care products, coatings used in printing and photography, wood finishes, and the like. Different levels of sheen (from glossy to matte) are necessary for a variety of applications and tastes. These levels range from high gloss, semi-gloss, eggshell, flat, matte, and the like.

Conventional measures for reducing gloss include adding any of various gloss control (reducing) agents to a polymeric coating composition. Examples include solid particulate materials such as silica, matte-producing wax emulsions, and high-acid functional polymer thickeners.

Polymeric floor care products, sometimes referred to as polish, finish, or wax, often are used to protect and enhance appearances of floors made of wood, synthetic resins, concrete, marble, terrazzo, stone, and the like. These products require periodic application of liquid polymeric floor care compositions, which dry to a protective finish. The protective finish can exhibit properties such as resistance to scratching and scuffing, resistance to marking from shoes, and the like, along with a selected sheen (high gloss, gloss, flat, matte, etc.). The floor care composition is applied to a floor surface and allowed to form a film (coalesce) as the carrying solvent evaporates. Film formation desirably can occur at room temperature and the resulting film desirably can be burnished or removed if damaged or compromised.

In floor polish compositions, one or more film-forming polymers are dissolved, dispersed, or suspended in a liquid medium. Although organic solvents can be used, water is the liquid medium of choice in many currently commercial polymer compositions. Because many polymers are insoluble in water, aqueous floor polish compositions also require surfactant to keep the polymer particles dispersed or suspended in the continuous aqueous phase. Other common ingredients include one or more crosslinking agents (preferably one that can reversibly crosslink the polymer chains from which the protective film is formed), one or more materials designed to aid in the flow, wetting, or leveling of the composition across the floor surface, one or more coalescents, plasticizers, and waxes.

Many different types of polymers have been used to make floor polish compositions. Commercial polishes typically include styrene-acrylic interpolymers, i.e., polymers that include mer derived from one or more acrylic-type monomers and styrene mer. Floor polishes based on a styrene-butadiene interpolymers recently have become available.

That which remains desirable is a gloss reducing agent that can be used with a variety of polymers in finish compositions.

SUMMARY

Briefly, the described invention involves polymer materials and compositions that include polymer and a metal salt of a fatty acid as a gloss control (e.g., gloss reducing) agent. These include polymer compositions and their derivatives, such as various types of finish compositions. A polymer-containing composition can be a liquid suspension, dispersion, water-based, solvent-based, or any other form useful to produce a dried or cured (i.e., "dried") polymer coating on a surface; examples include floor care compositions, paints, wood finishes, waxes, polishes, etc., for application to and protection of surfaces including floors, walls, furniture, or other vertical or horizontal surfaces. The polymer compositions and derivative finish compositions can exhibit useful or advantageous stability, film-forming properties, and other physical properties, and dried coatings of a polymer composition or a finish composition can exhibit a selected gloss level based on varying amounts or types of ingredients including the metal salt of a fatty acid. An exemplary metal salt of a fatty acid is calcium stearate.

In one aspect is provided a polymer composition that includes polymer, organic or aqueous liquid, and metal salt of a fatty acid. The composition includes from 0.5 to 10 parts by weight (pbw) metal salt of a fatty acid and from 10 to 45 pbw polymer. The polymer composition can be in the form of a finish composition.

The finish composition can be in dried form and, when thus provided, can exhibit a gloss reading, when measured according to ASTM D-1455-87, of below 50.

In another aspect is provided a method of providing a polymer composition. To a polymer in a liquid medium is added a metal salt of a fatty acid in an amount to reduce gloss of the polymer composition upon drying.

Still further aspects involve methods of providing the foregoing coated floor and of providing the composition.

Other aspects of the present invention will be apparent to the ordinarily skilled artisan from the description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"polyene" means a molecule with at least two double bonds located in the longest portion or chain thereof, and specifically is inclusive of dienes, trienes, and the like;

"polydiene" means a polymer that includes mer units from one or more dienes;

"polymer composition" means a composition that includes at least one type of polymer and at least one metal salt of a fatty acid;

"additional ingredient" means any one or more additives, adjuvants or other compounds or complexes added to a polymer composition to produce or provide a desired physical property or effect (e.g., a film formation, leveling, chemical or mechanical stability, chemical reactivity upon cure or drying, compatibility between ingredients, viscosity modification, color, or another aesthetic property) that otherwise would not present, or present to a different degree, in a polymer composition;

"finish composition" means a polymer composition to which has been added one or more additional ingredients so to provide composition having a specific utility such as, e.g., a paint, wax, polish, floor care composition, wood finish, or other coating product;

"external surfactant" means a surface active agent that is separately added directly to a composition and is not present as a result of being a component of another ingredient of the composition;

"internal surfactant" means a surface active agent that is used in the preparation of a polymer; and "gloss" means the intensity of specularly reflected light, a measurement which acts as an indicator of the relative roughness of the reflecting surface.

All values herein in the form of percentages are weight percentages unless the surrounding text explicitly indicates a contrary intention, and all descriptions of minimum and maximum values for a given property further include ranges formed from all combinations of individual minimum and individual maximum values.

DESCRIPTION OF ILLUSTRATIVE EMBODIMENTS

The described invention involves polymer-containing compositions referred to as polymer compositions and finish compositions, each of which contain polymer and a metal salt of a fatty acid as a gloss control agent. A polymer-containing composition can contain solids in the form of polymer and metal salt of a fatty acid, these ingredients being dissolved, dispersed, suspended, or otherwise contained in a liquid medium. The liquid medium may be water, an organic solvent, or a combination of water and organic solvent, and can preferably an aqueous medium that contains mostly or entirely water.

Exemplary polymer compositions contain solid ingredients that consist of or consist essentially of polymer and metal salt of a fatty acid, suspended, dissolved, or dispersed in a liquid medium that is organic or aqueous. Preferred liquid media include water or a blend of water and organic solvent that is at least 50 weight percent water (based on total weight of the liquid medium), often more than 80 weight percent water, and typically more than 90 or 95 weight percent water.

For a composition that "consists of" polymer and metal salt of a fatty acid, the solids can include synthetic polymer(s) as described herein and metal salt of a fatty acid, as well as small amounts of other ingredients used to prepare the polymer or the metal salt of a fatty acid. Such ingredients can include non polymer byproducts of the polymerization reaction; solid ingredients useful or appurtenant to preparation of the polymer such as chain transfer agent (e.g., up to ~3 weight percent based on total weight of monomers), internal surfactant, commonly used at up to ~5 weight percent surfactant based on the amount of polymer, catalyst, plasticizer, coalescing agent, internal crosslinking agent (e.g., used at up to ~3 weight percent), and any other polymerization or processing aids, if used; and unused monomer or other reactant(s). Examples of non-monomer ingredients used to prepare a polymer are described in more detail below.

Solids that consist essentially of polymer and metal salt of a fatty acid also can include the foregoing ingredients as well as small amounts of other ingredients such as any non-polymer byproducts of a polymerization reaction (low molecular weight reaction products) or unused reactants (monomer, internal crosslinking agent, etc.); any other solid ingredient useful or appurtenant to preparation of the polymer such as chain transfer agent, surfactant (commonly used at up to ~5 weight percent surfactant based on the amount of polymer), catalyst, plasticizer, coalescing agent, other polymerization or processing aids, if used; and can also be considered to include up to ~5 weight percent of other solid ingredients (based on total weight solids of the polymer composition), e.g., up to 3 weight percent other solid ingredients, preferably less than 2 or 1 weight percent other solid ingredients based on the total amount (weight) of the solids in the polymer composition. These "other" ingredients can be any ingredient used to improve a polymer composition or to prepare a finish composition, many general and specific examples of which are described herein.

Certain preferred polymer compositions can be aqueous emulsions or dispersions that include particles of polymer entrained throughout a continuous aqueous phase, and also containing metal salt of a fatty acid such as calcium stearate. The total amount of solids (e.g., total solids by weight) in a polymer composition can vary widely including, for example, from 30 to 60 weight percent total solids, from 35 to 55 weight percent total solids, or from 38 to 45 weight percent total solids, based on the total weight of the polymer composition.

As part of the total solids, a polymer composition can contain any desired or useful amount of polymer solids, e.g., relative to total solids of a polymer composition. Exemplary amounts of polymer solids relative to total solids in a polymer composition can be an amount of polymer in the range from 70 to 98 weight percent polymer per total weight solids of a polymer composition, commonly from 75 to 98 weight percent polymer per total weight solids. The remaining solids can be made up of other useful solid materials such as metal salt of a fatty acid or materials used in or remaining from a process of producing polymer. (In this context, and unless specifically indicated otherwise herein, weight percent polymer refers to only polymer material and not to solid materials used to prepare the polymer or solid materials that are byproducts of a polymerization reaction, if present).

Polymer compositions and finish compositions derived therefrom can contain any useful amounts of polymer and metal salt of a fatty acid, e.g., amounts that result in one or more desired utility, stability, compatibility, etc., of a polymer composition or a derivative finish composition, including desired gloss properties. Preferred amounts of polymer to metal salt of a fatty acid in a polymer composition can be up to 10 pbw metal salt of a fatty acid per from 10 to 45 pbw polymer, e.g., from 2 to 6 pbw metal salt of a fatty acid per 12 to 40 pbw polymer. These amounts can apply to the relative amounts of these two ingredients in both a polymer composition and in any type of finish composition, unless additional amounts of polymer or metal salt of a fatty acid are added to the polymer composition to produce the finish composition. (In this context, parts by weight polymer refers only to polymer material and not to materials used to prepare the polymer or materials that are byproducts of a polymerization reaction, if present).

Non-limiting examples of useful polymers include any of a variety of polyacrylates, styrene-polydiene polymers, polyurethanes (e.g., aqueous polyurethane resin comprising polyurethane polymer that includes a bonded carboxylic acid or carboxylate group), and the like, or otherwise useful in preparing finish compositions such as paints, floor care compositions, wood finishes, waxes, polishes, etc.

Metal salts of a fatty acid include chemical compounds that include a hydrocarbon (i.e., monovalent hydrocarbyl) chain, a carboxylic acid, and an associated metal ion. Their general formula is $M^{+x}[O^-(C=O)_x]$, where M is a metal that may be mono- or multi-valent, i.e., x can be an integer such as 1, 2, or 3; examples of metal atoms designated M include Ca, Al, Mg, and others such as Zn, Ba, Zr, Ni, Fe, Cd, Sr, Bi, Be, Co, Pb, Cu, Ti, Sb, etc.), with $Ca^{+2}$ being a preferred metal ion. Optionally, mixtures of two or more different metals can be included with metal salts of one or more fatty acid, in a composition as described. In the formula, R can be a hydrocarbyl group that can be a straight, branched, and optionally saturated or unsaturated monovalent $C_5$-$C_{25}$ hydrocarbon chain, e.g., $C_{15}$-$C_{20}$ in length; examples of corresponding acids include stearic acid, oleic acid, linoleic acid, palmitic acid, arachidic acid, combinations of these, and others. Optionally, mixtures of two or more different hydrocarbyl groups can be included with metal salts of fatty acids, in a composition as described.

A particularly preferred M for purposes of affecting gloss of a dried polymer composition or a finish composition, is calcium, commonly found as calcium ion, $Ca^{2+}$. A particularly preferred hydrocarbyl chain of a metal salt of a fatty acid for use in a polymer composition or finish composition as described herein, e.g., a floor care composition, to affect gloss of a dried polymer composition or a dried finish composition, is a saturated $C_{18}$ hydrocarbyl stearate chain derived from the stearate anion of stearic acid ($C_{17}H_{35}COO^-$). A particularly preferred metal salt of fatty acid for use in a polymer composition as described herein, to affect gloss of a dried polymer composition or a dried finish composition, is calcium stearate, also known as calcium octadecanoate ($Ca(C_{18}H_{35}O_2)_2$).

The metal salt of a fatty acid can constitute any portion of a polymer composition or finish composition that results in gloss control. The metal salt of a fatty acid normally can be added to a polymer composition after reaction of monomers to form polymeric chains, so metal salt of a fatty acid normally is not incorporated into polymer as a mer unit, or as crosslinking agent, or by mechanical association within polymer particle. Upon addition to a polymer composition (e.g., latex), the metal salt of a fatty acid may become dissolved, suspended, or dispersed, in a liquid medium of the polymer composition such as a continuous liquid phase. If suspended or dispersed as particles in a continuous liquid phase, the particles can be of any size (designated as an average or mean of particle diameter) useful to produce a desired gloss reducing or matting effect, e.g., less than 300 nm mean diameter, from 50 to 200 nm mean diameter, or from 100 to 180 nm mean diameter.

Exemplary finish compositions include floor care compositions, waxes, polishes, wood finish products, photographic and printing coatings, paints, glass (window or lens) coatings, and the like. A finish composition can include amounts of polymer and other solids that can be useful in any one or more of these, or other, coating applications.

Finish compositions can be emulsions or dispersions that include discontinuous particles of polymer dispersed or suspended in a continuous liquid phase, metal salt of a fatty acid such as calcium stearate, and added ingredients desired in a finish composition. The relative amounts of liquid medium of a continuous liquid phase to solids (polymer, metal salt of a fatty acid, and other solid ingredients) in a finish composition, can be any useful amounts, for example an amount of liquid medium (e.g., water, organic solvent, or a blend of these) to produce a composition that includes from 5 to 40 weight percent total solids, from 10 to 30 weight percent total solids, or from 12 to 25 weight percent total solids (per total weight finish composition).

A finish composition provided by blending one or more additional ingredients into a polymer composition can include solids present from the starting polymer composition and additional solids from the additional ingredients. (The amounts and types of solids in the polymer composition can be as described herein.) Exemplary amounts of solids in certain embodiments of finish compositions that are present due to their presence in a starting polymer composition to which one or more additional ingredients are added (this includes polymer solids, metal salt of fatty acid, and any other solids present in a polymer composition as described herein), relative to a total amount solids in a finish composition, can be an amount of solids in the range from 70 to 92 weight percent solids present as a portion of the polymer composition, per total weight solids of a finish composition, e.g., from 80 to 90 weight percent solids present as a portion of the polymer composition per total weight solids in a finish composition. In certain embodiments, the remaining 8 to 30 or 10 to 20 weight percent solids can be made up of solid materials, e.g., additional ingredients, added to the polymer composition to produce the finish composition as described herein, including amounts of surfactant, defoamer, leveling agent, etc., as described and as otherwise known in the polymer and finish composition arts, as desired and useful.

Examples of additional ingredients include surfactants, pigments, wax(es), leveling agents, stabilizers, preservatives, etc. Specific examples of useful ingredients used to produce a finish composition include crosslinkers, catalysts, surfactants (any type), antifoam agents, waxes, pigments, plasticizers, coalescents, leveling agents, antimicrobial agents or other preservatives, and even additional gloss control agents if desired.

In alternate embodiments, other relative amounts of solid materials added to a polymer composition as "added ingredients," per total solids, can be useful, such as when a relatively larger amount of wax, alkali-soluble resin, or polyurethane polymer, is added to a polymer composition.

Relative amounts of polymer solids and metal salt of a fatty acid in a finish composition can be the same as those present in the polymer composition from which a finish composition is prepared. For instance, if additional ingredients do not include additional metal salt of fatty acid or polymer solids, the relative amounts of these two ingredients in a finish composition will be the same as their relative amounts in the polymer composition.

In alternate embodiments of finish compositions and their methods of preparation, in addition to additional ingredients discussed directly above, metal salt of a fatty acid can be added to a polymer composition as an additional ingredient to further modify gloss of a derivative coating of the finish composition. A polymer composition can be prepared, e.g., for sale or use, to include a specified level of metal salt of fatty acid on any given basis, such as an amount relative to the weight of polymer solids in the polymer composition, an amount of a total weight of polymer composition (of which the metal salt of a fatty acid is a component), an amount of a total weight of all solids in a polymer composition, etc. According to embodiments of compositions and methods of the described invention, additional ingredients blended with the polymer composition, containing a known amount of metal salt of fatty acid, optionally can include an additional amount of metal salt of fatty acid, e.g., to alter or tailor (e.g., reduce) the gloss level of the dried finish composition. The amount can be such that, when added to the amount in the polymer composition, will result in a desired level of gloss of a dried finish composition.

An example of a finish composition is a floor care composition, which can include useful amounts of polymer and metal salt of a fatty acid, as described above, and further may contain any one or more added ingredients including surfactant (which may be any of various known types including anionic, ionic, nonionic, etc.), plasticizer, wax, defoamer, preservative, combinations of these, or other added ingredients.

A typical floor care composition can be characterized as a suspension or dispersion of solid particles, including polymer(s) in a liquid medium, preferably a continuous aqueous phase that includes a large amount of water, a majority of water, or preferably entirely water. Exemplary descriptions of such compositions and their production can be found in U.S. Pat. Nos. 3,328,325, 3,467,610, 3,554,790, 3,573,329, 3,711,436, 3,808,036, 4,150,005, 4,517,330, 5,149,745, 5,319,018, 5,574,090, 5,676,741 and 6,228,913, as well as subsequent patent documents citing these. Examples of suitable polymer materials useful within latex (water-based) or solvent-based liquid media and that can form useful films or coatings include, but are not limited to, polymers known as acrylate polymers, styrene-polydiene polymers, polypropylenes, polyacetals, polyamides, polyesters, polystyrenes, polyvinyl chlorides, polyvinylidene chlorides, polyurethanes, polyureas, and the like.

The non-volatile solids content of such floor care compositions can be at least ~20%, ~18%, ~15%, or even as little as ~5%, and can be up to ~25%, ~30%, ~35%, or even ~40%. The non-volatile solids can include a minimum of ~80%, ~75%, or even ~70% synthesized polymer; in these or other embodiments, synthesized polymer can constitute up to ~85%, ~90%, ~94%, ~96%, ~98%, or even ~99% of the non-volatile solids. The dynamic viscosity of such compositions, when measured by a Brookfield viscometer using a #1 spindle at 1 rotation per second, usually are less than ~0.01 Pa·s (10 cP).

The polymer of a polymer composition refers to a synthesized polymer generally in the form of water insoluble particles dispersed, suspended or otherwise entrained in a liquid. Commonly the polymer can be in the form of solid polymer particles dispersed or suspended within a liquid medium such as a continuous aqueous phase; this form of a latex may be considered an emulsion, a dispersion, or the like. The dynamic viscosity of the polymer (e.g., in the form of a latex) when measured as described above is generally less than ~0.25 Pa·s (250 cP). Polymer particles optionally can include compositionally distinct regions, e.g., core-shell architecture, or can be substantially homogeneous. Average or mean diameters of polymer particles can typically be less than ~140 nm, generally less than ~100 nm, commonly less than ~90 nm, and often less than ~80 nm, although rarely less than ~70 nm. (Particle size can be given as an average determined by capillary hydrodynamic fractionation, a chromatographic method in which particles of varying sizes elute at different times from a narrow-bore capillary column.) Particle size distribution generally is less than 2.0, commonly less than 1.5, more commonly less than 1.1, and preferably on the order of ~1.05. Polymer particles can display essentially any gel content value, although common values range from ~50-90%. The polymer (solids) content of the latex can generally range from ~30 to ~55%, although higher amounts can be achieved in certain circumstances.

Useful polymers can have a glass transition temperature ($T_g$) of at least 10° C., at least ~20° C., at least ~30° C., or at least ~40° C., and as high as 100° C., commonly ~80° C., more commonly ~70° C., and even more commonly ~60° C. The $T_g$ of a given polymer may be determined by differential scanning calorimetry (DSC) tests performed on dried films made from the polymer or can be estimated from the Fox equation.

As mentioned previously, a variety of synthetic polymers can be used in such compositions. A significant number of these are commonly referred to as acrylic polymers because of their inclusion of mer derived from (meth)acrylic acid or alkyl esters thereof. These polymers generally include up to 70%, commonly ~10 to ~50%, vinyl aromatic mer such as can result from inclusion of at least one of styrene, any of a variety of halogenated styrenic monomers, vinyl toluene, o- or p-methoxy styrene, allyl phenyl ether, allyl tolyl ether and α-methyl styrene;

from ~3 to ~50%, commonly ~5 to 20%, acidic mer such as can result from inclusion of at least one of maleic acid, fumaric acid, cinnamic acid, aconitic acid, crotonic acid, citraconic acid, acryloxypropionic acid, (meth)acrylic acid, itaconic acid, and partial esters of those of the foregoing which are poly-acids;

from ~30 to ~97%, commonly ~35 to ~70%, mer derived from $C_1$-$C_{20}$, preferably $C_1$-$C_{12}$, alkyl (meth)acrylates such as methyl (meth)acrylate, ethyl (meth)acrylate, n-butyl (meth)acrylate, isobutyl (meth)acrylate, 2-ethyl hexyl (meth)acrylate, n-octyl acrylate, sec-butyl acrylate, cyclopropyl methacrylate, acetoacetoxyethyl (meth) acrylate, acetoacetoxypropyl (meth)-acrylate, acetoacetoxybutyl (meth)acrylate, 2,3-di(acetoacetoxy) propyl (meth)acrylate, and the like;

optionally up to 40% mer derived from at least one polar or polarizable non-ionogenic hydrophilic monomer, such as (meth)acrylonitrile, crotononitrile, α-cyanostyrene, α-chloroacrylonitrile, ethyl vinyl ether, isopropyl vinyl ether, isobutyl- and butyl-vinyl ether, diethylene glycol vinyl ether, decyl vinyl ether, vinyl acetate, isobornyl methacrylate, hydroxyalkyl (meth)acrylates such as 2-hydroxyethyl (meth)acrylate, 2- or 3-hydroxypropyl (meth)acrylate, butanediol acrylate, and 3-chloro-2-hydroxypropyl acrylate, as well as vinyl thiols such as 2-mercaptopropyl methacrylate, 2-sulfoethyl methacrylate, methyl vinyl thiol ether and propyl vinyl thin ether; and optionally up to 10% mer derived from at least one monomeric vinyl ester in which the acid moiety of the ester results from aromatic $C_1$-$C_{18}$ aliphatic acids such as formic, acetic, propionic, n-butyric, n-valeric, palmitic, stearic, phenyl acetic, benzoic, chloroacetic, dichloroacetic, γ-chloro butyric, 4-chlorobenzoic, 2,5-dimethyl benzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids.

(The relative amounts of mer may be approximated by the amounts of respective monomers used when the polymerization techniques and conditions permit substantially complete conversion.)

Also useful are styrene-polydiene interpolymers such as those in intl. publ. no. WO 2008/011020. In addition to the types of mer included in the polymers described immediately above, styrene-polydiene interpolymers can include from ~5 to ~50%, commonly from ~10 to ~40%, and more commonly from ~20 to ~35% polyene mer, typically resulting from inclusion of conjugated polyene mer such as 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like. A styrene-polydiene interpolymer can also can include relatively higher amounts of vinyl aromatic mer, e.g., up to ~75% or even 80%. When these interpolymers include acidic mer, which can result from inclusion of versatic acid in addition to the acidic monomers described above, floor care compositions incorporating the polymer can exhibit good durability, black heel mark resistance, and good water resistance. These interpolymers also can include up to ~10% mer derived from functional monomers that help to control the hydrophilic/hydrophobic properties of the polymer, improve the compatibility of the polymer with one or more additives, and/or affect hydrogen bonding with acid functionality in the polymer; examples of such functional monomers include 2-hydroxyethyl (meth)acrylate, n-methylol (meth)acrylamide, (meth)acrylamide, and the like.

Polymers of the foregoing types can be prepared by emulsion polymerization techniques such as those generally described in U.S. Pat. Nos. 3,573,239, 3,328,325, 3,554,790, 3,467,610, 5,166,259, and 6,425,978. These types of polymerization processes use up to ~5% of one or more surfactants which, for present purposes, are referred to as internal surfactants; examples of potentially useful internal surfactants include one or more of the following: salts of alkyl sulfosuccinates such as sodium dihexyl sulfosuccinate and sodium dioctyl sulfosuccinate; salts of alkyl sulfates such as sodium lauryl sulfate; salts of organo disulfonates such as dodecyl diphenyloxide disulfonate; sodium laureth sulfate; sodium lauryl ether sulfate; sodium laureth-12 sulfate; sodium laureth-30 sulfate; sodium dodecyl benzene sulfonate; and organophosphates such as those described in published patent appl. no. US 2005/0215678 A1. If desired, the emulsion polymerization mixture can include a plasticizer and/or coalescing agent, the inclusion of which can lower film formation temperature of the latex composition by up to 10°-20° C. The emulsion polymerization mixture also can include, based on the total weight of monomers, up to ~2% of an internal crosslinking agent such as divinylbenzene and any of a variety of functional di- and tri-(meth)acrylates and/or up to ~3% of a chain transfer agent.

Finish compositions such as paints and floor care compositions, among other types, are complex mixtures that, in addition to polymer latex, employ a wide variety of components in widely varying amounts and types. Many known and useful materials can be mixed into a polymer composition (e.g., latex) after preparation of the polymer and before transport without deleteriously affecting storage stability or other properties; alternatively, many of the same and/or other materials can be mixed with a latex subsequent to manufacture and transport. A variety of important types of added ingredients (especially for floor care compositions) that can be present in these compositions are discussed below. In addition to those, however, other additional components can include external surfactants, preservatives, defoamers, biocides, fragrances, dyestuffs, brighteners, antioxidants, and UV absorbing agents, among still others.

One commonly used added ingredient is an external crosslinking agent, which facilitates the linking of polymer particles or chains, typically through acid functionalities. Where a bifunctional external crosslinking agent is included, the agent can react or interact with acid functionalities on two chains, thereby linking those chains and improving certain characteristics of a coating that results from the finish composition. Salts or complexes of polyvalent metals (e.g., Ca, Mg, Zn, Ba, Al, Zr, Ni, Fe, Cd, Sr, Bi, Be, Co, Pb, Cu, Ti, Sb, etc.) often are used as external crosslinking agents, as is aziridine; some of the most commonly used complexes include zinc ammonium carbonate, zinc ammonium acetate, zinc ammonium acrylate, zinc ammonium maleate, zinc ammonium aminoacetate, calcium ammonium alanine, calcium ethylenediamine-ammonium carbonate, zirconium ammonium carbonate and zirconium ammonium maleate. The amount of external crosslinking agent included in a finish composition can be calculated on the equivalents of acid groups within a polymer chain of a polymer of the composition. Examples of useful amounts of external crosslinking agent can be from ~0.25 to ~0.5 mole crosslinking agent per equivalent of acid group in a polymer. Although not required, external crosslinking agent can be added to the polymerization medium after formation of latex but prior to formation of a finish composition (e.g., aqueous floor care composition), i.e., added to the latex composition prior to storage or shipment.

In certain preferred embodiments of floor care compositions, an external crosslinking agent can be zinc as opposed to other useful metal crosslinking agents. Zinc (e.g., ZnO) can be present in a floor care composition in an amount per acid functionality (of the polymer) of from 0.05 mole ZnO to 0.5 mole ZnO, per mole of acid functionality (—COOH) in the polymer.

In other floor care composition embodiments, the use of heavy metals such as zinc can be reduced or eliminated. In such compositions, amounts of zinc as a heavy metal external crosslinking agent (e.g., ZnO), or other heavy metal external crosslinking agent, can be kept to a level below about 0.05 mole heavy metal crosslinking agent per equivalent acid functionality (—COOH) in the polymer, preferably below about 0.01 mole heavy metal crosslinking agent per equivalent of acid functionality in the polymer.

Another commonly used added ingredient in a finish composition (e.g., floor care composition) is wax, which can affect sliding properties, durability, and black heel mark resistance of a floor coating provided from the composition. Examples of natural waxes include carnauba, paraffin, and the like, while examples of synthetic waxes include any of a variety of poly(alkylene)s and oxides thereof. Floor care compositions often contain wax, based on the total weight of nonvolatile components (solids) in a floor care composition, in amounts up to ~55 weight percent wax, commonly from ~1 to ~30 weight percent, and typically from ~5 to ~20 weight percent.

Another added ingredient that may be useful in finish composition such as a floor care composition is an alkali-soluble resin, which can affect the leveling properties of a composition. Examples of alkali-soluble resins include styrene-acrylic acid interpolymers, styrene-maleic acid interpolymers, rosin-maleic acid copolymer resins, water-soluble acrylic resins, water-soluble polyester resins, and water-soluble epoxy resins. Useful amounts of alkali-soluble resins based on total weight finish composition can be amounts up to ~50% alkali-soluble resin by weight, commonly from ~1 to ~20%, and typically from ~3 to ~10%.

Another added ingredient that may be useful in a finish composition such as a floor care composition is an aqueous polyurethane resin. An aqueous polyurethane resin can affect durability of a dried coating provided from the composition. Examples of aqueous polyurethane resins include polyurethanes that include a bonded carboxylic acid or carboxylate group. Polyurethane-type resins can be included in a finish composition, based on total weight of finish composition, can be up to ~80 weight percent aqueous polyurethane-type resins, commonly from ~1 to ~60%, and typically from ~20 to ~40%. (Thus, polyurethane can be an additional ingredient in the provision a floor care composition. This is in addition to the teaching elsewhere herein that a polymer composition also or alternatively can include polyurethane as one of its constituent polymers.)

Still another added ingredient that may be useful in a finish composition such as a floor care composition can be a plasticizer, which can be an ingredient that functions to reduce the minimum film-forming temperature of the composition. Exemplary plasticizers include dialkyl phthalates, 2-pyrrolidone, octyl diphenyl phosphate, esters of benzoic acid, and tributoxyethyl phosphate. Useful amounts of plasticizer in a finish composition, based on total weight finish composition, can be amounts up to ~5 weight percent, commonly from ~1 to ~4%, and typically from ~2 to ~3%.

Still another potentially useful added ingredient, particularly in floor care compositions, is a coalescent, which can assist in forming continuous films where the composition is applied at elevated temperatures. Exemplary coalescents include alcohols such as ethanol, isopropyl alcohol, etc., as well as polyols and glycol ethers. Useful amounts of coalescent based on total weight of a finish composition can be amounts up to ~10 weight percent coalescent, commonly from ~1 to ~7%, and typically from ~3 to ~5%.

An important component included in many floor care compositions is a leveling agent or aid. Many commercial floor care compositions include polyfluorooxetanes (see, e.g., U.S. Pat. Nos. 6,660,828 and 7,022,801), non-ionic surfactants, anionic surfactants, silicone-based surfactants, or fluorine-containing surfactants (e.g., Zonyl™ fluorosurfactants; DuPont, Wilmington, Del.) as leveling aids. When used, preferred amounts of leveling agent such as a fluorosurfactant (e.g., PolyFox™ PF-2002, OMNOVA Solutions, Akron, Ohio) can be present in a finish composition at any useful level, such as within the range from 50 to 200 ppm.

Exemplary compositions of the present description can include useful amounts of polymer and metal salt of a fatty acid (of a polymer composition) combined with added ingredients to produce a useful finish composition such as a floor care composition. Added ingredients combined with polymer composition to produce a floor care composition may include any one or more of surfactant, which may be any of various known types including anionic, ionic, nonionic, etc.; plasticizer; wax; defoamer; preservatives; and other ingredients.

In a non-limiting sense, certain ingredients may be useful in a polymeric floor care (finish) composition in amounts such as the following: from 10 to 45 or 12 to 40 pbw polymer solids (preferably suspended or dissolved in a continuous aqueous phase); from 0.5 to 10 or 2 to 6 pbw metal salt of a fatty acid, e.g., calcium stearate; up to 5 or from 0.5 to 2.5 pbw wax; and up to 10 or from 1 to 5 pbw plasticizer.

Other finish composition such as paints, protective wood finishes, etc., can be prepared using ingredients and amounts of ingredients that are common or well-known and useful for those functional coatings, such as by use of pigment for paints.

A polymer composition as described herein, including polymer and a metal salt of a fatty acid, can be prepared by providing or preparing a polymer, e.g., by any presently known method or any method that is developed in the future. Methods include known or useful latex polymerization methods. The prepared or otherwise provided polymer can be combined with the metal salt of a fatty acid, preferably after the polymer is prepared. In preferred embodiments the polymer is prepared as or provided in the form of a water-based latex (e.g., dispersion, suspension, or the like) comprising polymer particles suspended in a continuous aqueous phase. The polymer latex can be blended with metal salt of a fatty acid (e.g., calcium stearate). The metal salt of a fatty acid can be added to the synthesized polymer in a subsequent blending step, in a desired amount. A polymer composition prepared in this manner, described herein as containing solids that consist of or consist essentially of polymer and metal salt of a fatty acid, can be shipped, stored, used, or processed as desired.

The polymer composition can be used to prepare a finish composition as desired, by combining the polymer composition with added ingredients to form, e.g., a paint, wax, polish, wood finish, or floor care composition. The order of addition of ingredients to prepare the finish composition typically is not particularly important. One or more of the added ingredients, optionally dissolved or suspended in water, can (if desired or useful) be mixed with the polymer composition (preferably in the form of a latex) prior to shipment of the polymer composition to a location at which the finish composition is to be prepared.

One particularly desirable property of a polymer composition or a finish composition is stability. Emulsions are considered stable if they do not separate over a determined amount of time, such as over 30 days when stored at elevated temperature (between 125° to 150° F.).

A finish composition can be used as desired, e.g., to coat a vertical or horizontal surface. For example, a floor care composition can be used as a polishing or protective agent for floors, as well as other substrates such as furniture, vehicles, building materials (e.g., windows), and the like. A floor care composition can be used to provide coatings to floors made of wood, wooden materials, synthetic resins, concrete, marble, stone and the like.

A floor can be coated, and thereby protected, by applying a floor care composition to a floor substrate and allowing the coating to dry at ambient or elevated temperature; application of the floor care composition can be by fabric coating, brush spraying, brushing, etc., advantageously, at or about room temperature. Such coated floors can exhibit advantageous water resistance, scratch resistance, a desired degree of gloss (e.g., from semi-gloss to matte finish), and gloss retention. Additionally or optionally, the coated floor does not exhibit yellowing.

A floor care composition can be used to prepare a coated floor that has a coating (i.e., film) thickness of up to ~70 μm, commonly from ~5 to ~50 μm, and typically from ~10 to ~30 μm. Film thickness can be developed over several applications.

Coatings of the invention (floor care coatings, paint coatings, or otherwise) can be characterized by the described use of a metal salt of a fatty acid (e.g., calcium stearate) to control degree of gloss of a dried coating. For example, a dried coating may have a gloss value measured at 60° (using a procedure such as that set forth in ASTM D-1455-87, employing 3 coats at an application weight of 2 mL/ft$^2$ (0.0929 mL/m$^2$) on a standard vinyl tile) of below 65, such as below 50, below 40, below 30, below 20, or below 10.

An exemplary finish (floor care) composition is provided below. The as-recited formulation does not include any metal salt of fatty acid, but a desired amount of a metal salt of fatty acid (e.g., calcium stearate) can be added to reduce the gloss of the recited finish composition. (All values are weight percentages, with the total summing to 100%)

| | | |
|---|---|---|
| A | water | 47.22 |
| | diethylene glycol monoethyl ether | 4.05 |
| | tributoxyethyl phosphate | 2.70 |
| | PolyFox ™ TM-1 fluorosurfactant (OMNOVA Solutions) | 0.05 |
| | defoamer | 0.01 |
| | preservative | 0.05 |
| B | Mor-Glo ™ 2 polyacrylate emulsion, 38% solids (OMNOVA Solutions) | 39.47 |
| | Conrez ™ alkali-soluble resin, 30% solids (OMNOVA Solutions) | 1.00 |
| C | AC-325 nonionic wax emulsion | 3.57 |
| | Epolene ™ E-43 nonionic wax emulsion | 1.88 |

The A ingredients are mixed for 5-10 minutes before addition of the B ingredients. After another 5-10 minutes of additional mixing, the waxes (C ingredients) are added followed by ~30 minutes of mixing. The total solids content of this composition is 20 weight percent.

Provided below are exemplary floor care composition formulations (with all values being weight percents), each having 25% total solids (by weight).

| | 1 | 2 |
|---|---|---|
| water | 40.13 | 37.53 |
| diethylene glycol ethyl ether | 2.23 | 2.80 |
| tributoxyethyl phosphate | 2.68 | 3.36 |
| PolyFox ™ PF-2002 fluorosurfactant (OMNOVA Solutions) | 0.05 | 0.05 |
| NM ™ 128 latex, 38% solids (OMNOVA Solutions) | 39.13 | |
| Sunkote ™ 459 calcium stearate, 50% solids (OMNOVA Solutions) | 9.00 | |
| 5:95 (wt.) blend, Sunkote ™ 459 & NM ™ 128, 39% solids | | 50.55 |
| Epolene ™ E-43 nonionic wax emulsion | 2.50 | |
| AC-325 nonionic wax emulsion | 4.29 | 5.71 |

The invention claimed is:

1. A composition comprising, in a liquid medium, from 0.5 to 10 parts by weight metal salt of a fatty acid, wherein the metal is divalent or trivalent, from 10 to 45 parts by weight of one or more polymers comprising an acid functionality, from 0.5 to 5 parts by weight wax, 1 to 10 parts by weight plasticizer, and a polymer crosslinking agent comprising a salt or complex of a polyvalent metal which is different than the metal salt of the fatty acid, the polymer crosslinking agent is present in an amount greater than 0 and below about 0.05 mole per mole equivalent acid functionality of the polymer.

2. The composition of claim 1 comprising from 30 to 60 weight percent solids, said liquid comprising water.

3. The composition of claim 1 comprising from 0.5 to 2.5 parts by weight wax and from 1 to 5 parts by weight plasticizer.

4. The composition of claim 3 comprising from 5 to 40 weight percent solids, said liquid comprising water.

5. The composition of claim 4 further comprising at least one fluorosurfactant.

6. The composition of claim 1 wherein said fatty acid is stearic acid.

7. The composition of claim 6 wherein said metal salt of the fatty acid is calcium stearate.

8. The composition of claim 1 wherein at least one of said one or more polymers comprises (a) styrene and (b) acrylate mer or polyene mer.

9. A coated floor comprising a dried form of the composition according to claim 3 coated on a floor substrate.

10. The composition according to claim 1 comprising
from 2 to 6 parts by weight metal salt of a fatty acid, wherein the metal is divalent or trivalent,
from 12 to 40 parts by weight acrylic polymer, and
from 30 to 60 weight percent solids in an aqueous medium.

11. The composition according to claim 1 wherein the fatty acid comprises a linear, saturated alkyl chain having from 15 to 25 carbon atoms.

12. A method of providing a polymer finish composition, the method comprising
providing a polymer composition as recited in claim 1, and
combining the polymer composition with added ingredient to produce a polymer finish composition.

13. The coated floor according to claim 9 wherein the dried composition exhibits a gloss reading of below 50 when measured according to ASTM D-1455-87.

14. The composition according to claim 1 wherein the metal salt of a fatty acid is a calcium salt of a fatty acid.

15. The composition according to claim 1 wherein the metal is selected from Ca, Al, Mg, Zn, Ba, Zr, Ni, Fe, Cd, Sr, Bi, Be, Co, Pb, Cu, Ti, and Sb.

16. The composition according to claim 1 wherein the metal is divalent.

17. The method of claim 12 comprising applying the polymer finish composition to a floor.

18. A composition comprising, in a liquid medium, from 6 to 10 parts by weight metal salt of a fatty acid, wherein the metal is divalent or trivalent, from 10 to 45 parts by weight of one or more polymers, from 0.5 to 5 parts by weight wax, and 1 to 10 parts by weight plasticizer.

19. A composition comprising, in a liquid medium, from 0.5 to 10 parts by weight metal salt of a fatty acid, wherein the metal is divalent or trivalent, from 10 to 45 parts by weight of one or more polymers comprising an acid functionality, from 0.5 to 5 parts by weight wax, 1 to 10 parts by weight plasticizer, and a polymer crosslinking agent comprising a salt or complex of a polyvalent metal which is different than the metal salt of the fatty acid, wherein at least one of said one or more polymers comprises styrene and polyene mer.

* * * * *